UNITED STATES PATENT OFFICE.

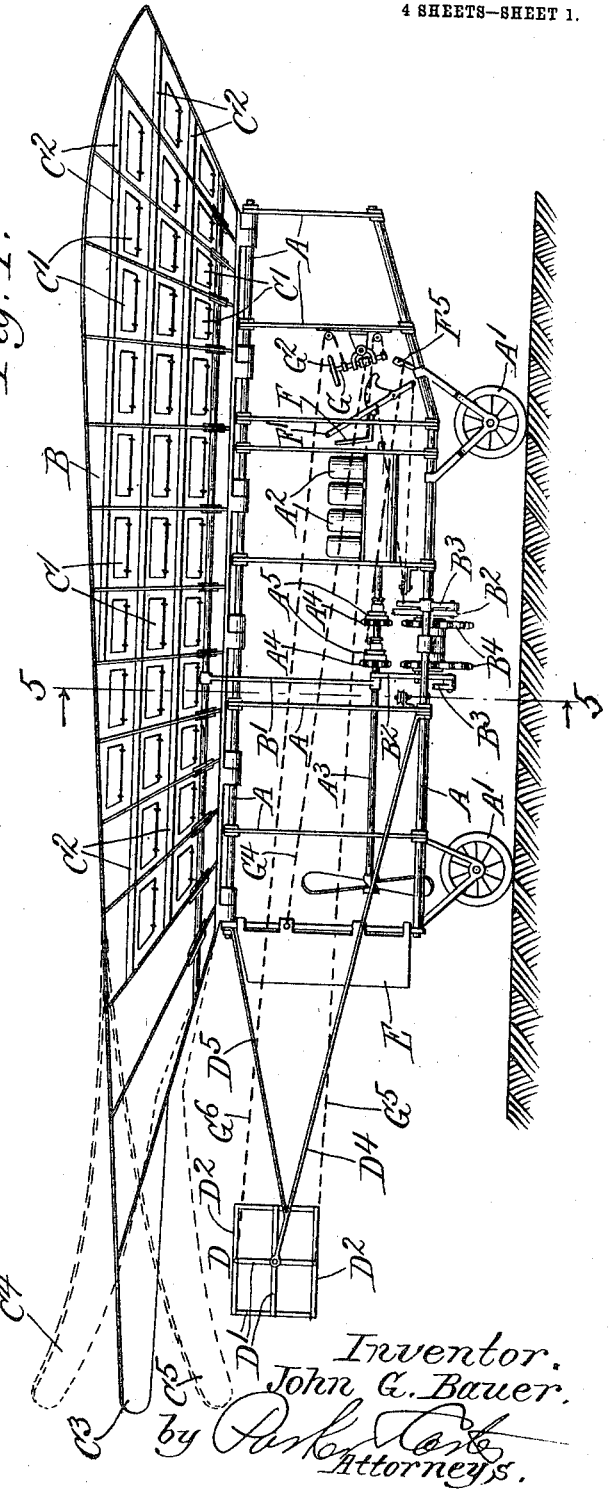
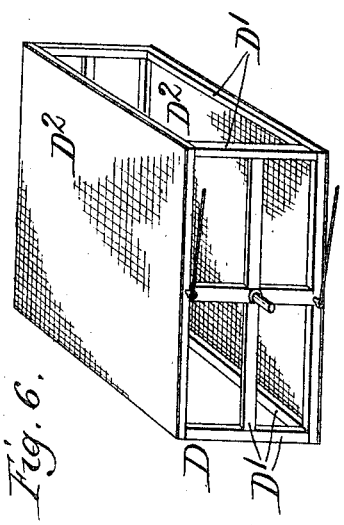

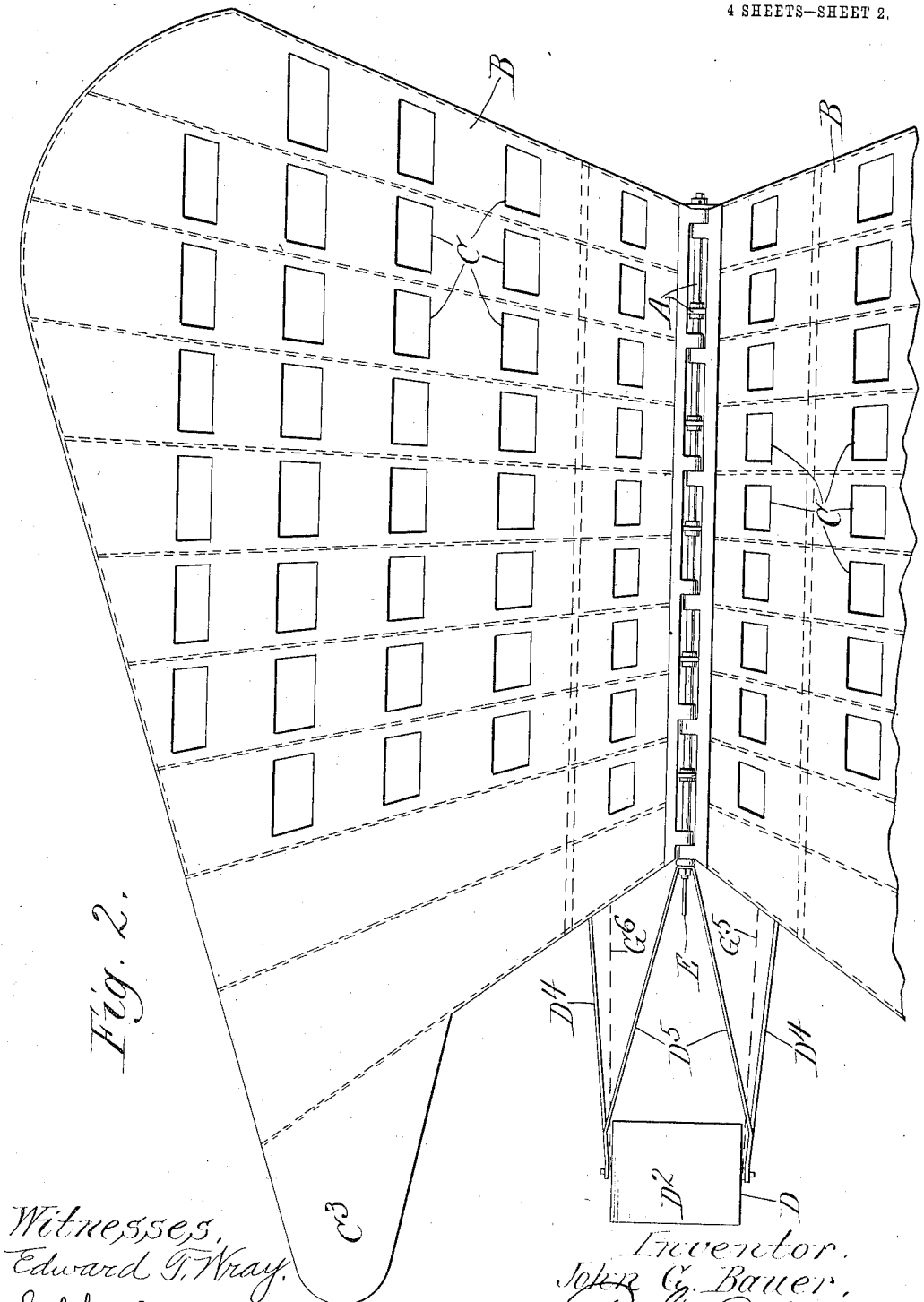

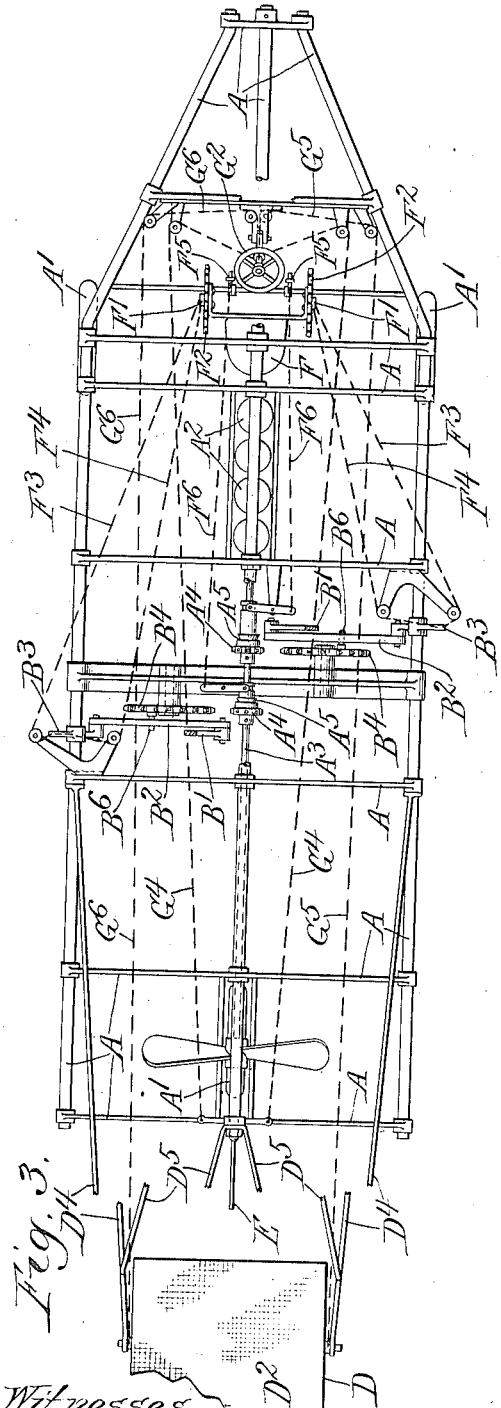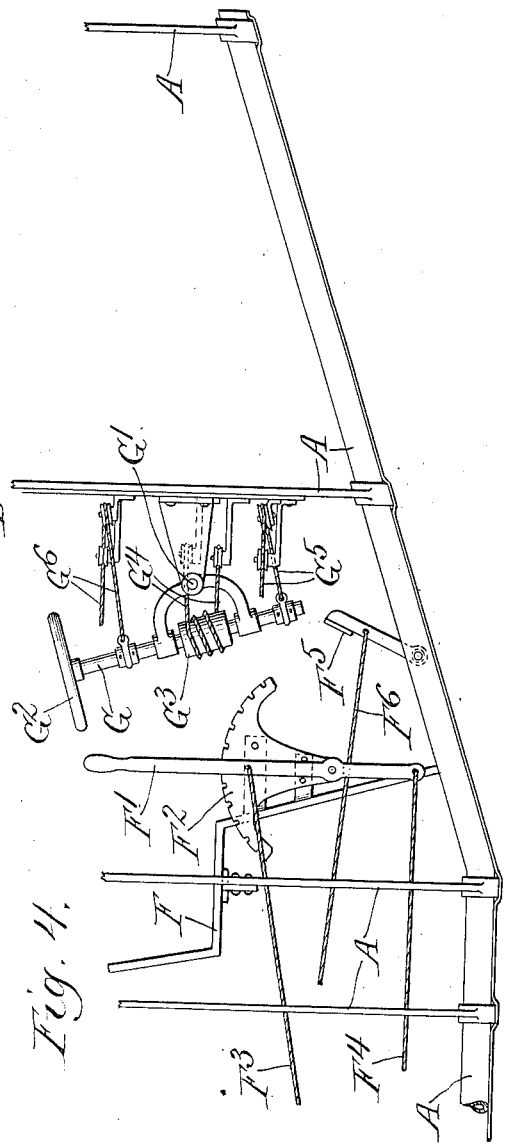

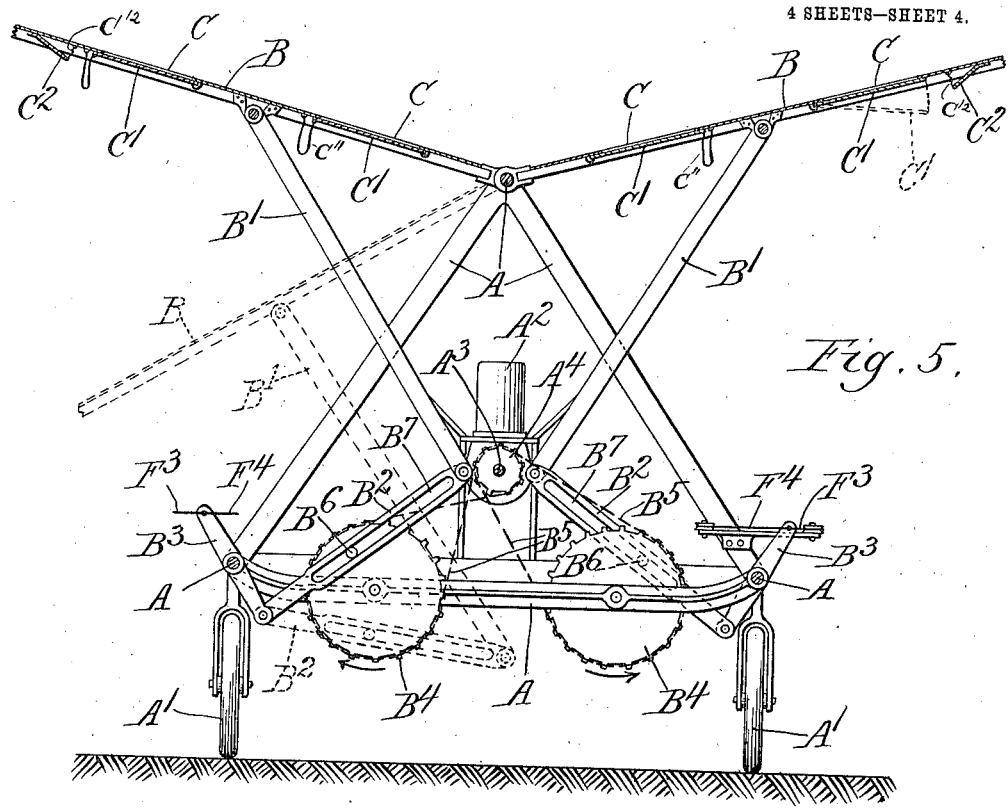

JOHN G. BAUER, OF CLEVELAND, OHIO.

AIRSHIP.

1,036,780.

Specification of Letters Patent.

Patented Aug. 27, 1912.

Application filed September 2, 1910. Serial No. 580,199.

*To all whom it may concern:*

Be it known that I, JOHN G. BAUER, a citizen of the United States, residing at Cleveland, in the county of Cuyahoga and State of Ohio, have invented a certain new and useful Improvement in Airships, of which the following is a specification.

My flying machine consists of a triangular frame having a plurality of wings pivotally mounted at the top of the frame, connecting rods pivotally mounted upon the wings and leading to lever arms adjustably mounted upon the frame, crank wheels in engagement with slots in said lever arms and driven by a motor. The rotation of the crank wheels oscillates the lever arms, thus causing the connecting rods to reciprocate, and driving the wings up and down about their pivotal point. The point of pivotal connection between the lever arm and the frame is adjustable in a direction perpendicular to the axis of rotation of the crank wheels, this adjustment being provided to change the length of stroke of the wings.

The arrangement of the lever arms and crank wheels is the same as that of the wheel and crank in a shaper and gives a rapid return motion. That is to say, the upward motion of the wings is relatively much more rapid than the downward motion. The wings are provided with a large number of perforations covered by flaps and as the wings ascend the flaps open removing the air pressure but as the wings descend the flaps are closed and a continuous surface upon which the air pressure is exerted, is presented. In order that the air may not too easily slip from under the wings, the wings are provided with a large number of flaps or strips loosely mounted upon the underside of the wing and adapted to project therefrom when the wing is on its downward stroke, thus offering resistance to the air and increasing the total skin friction of the wing.

The rear extremities of the wings are made up of relatively flexible fabric so that as the wings go down the flexible rear end of the wing is bent up and as the wing goes up the flexible rear end is bent downwardly. This causes the wings to exert a driving motion in much the same manner as the flexible tips of the tail of a fish.

The machine is guided from a seat located immediately in front of the engine and from this operator's seat lead cords controlling a rudder consisting of a single vertical plane in a line with the axis of the frame to control the direction of the boat in a horizontal plane and cords to a horizontal rudder consisting of a pair of parallel planes which are adapted to control the motion of the boat in a vertical plane. These cords are in connection with a steering wheel, the cords leading to the rudder being carried around a drum on the steering post which drum may be rotated by a wheel, the cords controlling the horizontal rudder being connected to either end of the steering post, the post adapted to be rotated about a pivotal support to control the horizontal rudder. Levers are provided at either side of the operator's seat to vary the stroke of the wings, thus enabling turns to be more easily taken and pedals are provided to control the clutches to throw one or both of the wings out of operation.

My invention relates to improvements in air ships and is illustrated in the accompanying drawings wherein—

Figure 1 is a side elevation, Fig. 2, a plan view, Fig. 3, a plan view with wings removed, Fig. 4, a detail of the controlling mechanism, Fig. 5, a section along the line 5—5 of Fig. 1, Fig. 6, a detail of the rudder.

Like parts are indicated by the same letters in all the figures.

The triangular main frame A is mounted upon the ground wheels $A^1$ and carries midship the engine $A^2$ which drives the shaft $A^3$ upon which are mounted the sprockets $A^4$ and clutches $A^5$. The wings B which are pivotally mounted at the upper apex of the frame are driven by means of the connecting rods $B^1$ which are in pivotal engagement with the driving levers $B^2$ which in turn are pivotally mounted upon one end of the lever $B^3$ pivotally mounted upon the frame. The sprockets $B^4$ are driven by means of the chain $B^5$ from the sprockets $A^4$ and carry the outwardly projecting lugs $B^6$ in slidable engagement with the slots $B^7$ in the lever $B^2$.

The wings B are perforate at C and the perforations may be closed by the pivotally mounted shutters or flaps $C^1$ on the under side of the wings B. These shutters or flaps are adapted to rotate each about the side adjacent the axis of rotation of the wings and are limited in their downward excursion away from the wing B by the holding means or cord C. The vanes $C^2$, which are arranged longitudinally along lines parallel with the axis of rotation of the wing, are interposed between the perforations C and are rotatably mounted upon the under side of the wings B, being rotatable about that side which is farthest removed from the axis of rotation of the wings B and limited in their motion away from the wings by the holding cord $C^{12}$. These vanes are placed between each group of openings in the wings and their function is, of course, to add by their presence to the total skin friction of the wings and minimize to as great an extent as possible the slippage of air from beneath the wing. Their function thus is to serve to arrest the downward movement of the air current along the under surface of the wing and thus increase the lifting power of the wing. The rear extremities of the wings form continuous surfaces and have the rearwardly extending vanes $C^3$ which are flexibly mounted and adapted to depart from the plane of the wing as indicated at $C^4$, $C^5$ in Fig. 1.

The horizontal rudder D is made up of the frame $D^1$ which carries the top and bottom planes $D^2$ and is pivotally mounted upon the arms $D^4$, $D^5$ projecting rearwardly from the frame. The rudder E is pivotally mounted in a vertical position upon the rear of the frame. The operator's seat F is located immediately forward of the engine and placed on either side of it are the levers $F^1$ which rotate about the quadrants $F^2$ and control by means of the cords $F^3$, $F^4$ the lever $B^3$ which operates to displace the lever $B^2$ along the sprocket $B^4$, thus changing the stroke of the wings. The lever $B^3$, which is pivoted intermediate its two ends and rotates, carries pivotally mounted at one end the lever $B^2$, and as the lever $B^3$ rotates it longitudinally displaces the lever $B^2$ and varies the distance between the pivotal point about which that lever oscillates and the point at which the crank pin on the sprocket comes in contact with it. Of course, this latter point varies in position as the sprocket rotates, but the limits within which it varies owing to this rotation are controlled by this longitudinal displacement and when the lever $B^3$ is moved to draw the pivotal point away from the sprocket, the advantage of the lever is decreased and the stroke of the wing reduced and vice versa. The pedals $F^5$ control by means of the cords $F^6$ the clutches $A^5$ to stop or start the operation of the wings. The steering shaft G is pivotally mounted at $G^1$ and has the hand wheel $G^2$ and spool $G^3$ upon which is mounted the cord $G^4$ to control the rudder, and the cords $G^5$, $G^6$ to control the horizontal rudder, the rudder being controlled by a rotational movement of the shaft, the horizontal rudder by a movement of the entire shaft about its pivotal connection.

The use and operation of my invention are as follows: When the motor is started and the pulley is thrown in the wings begin to flap owing to the arrangement and the angularity of the connecting rods and gears. The down stroke of the wing is much slower than the up stroke. As the wing flaps on the down stroke the valves covering the perforations in the wing are closed and the downward movement of the wing tends to lift the machine. As the wings rise the ports open, the wind passes through the wing and there is but slight tendency to force the machine down. As the wings descend again they again tend to lift the machine. The wings are independent one of the other and may be separately controlled by the operator. One or both may be stopped at will or the length of the stroke may be changed, or the speed of the stroke. A change in the pivotal point of the rocking lever by rotating the supporting lever will, of course, change the distance through which the wing oscillates. The flexible tips bend up as the wing goes down and bend down as the wing goes up and tend to force the machine forward. The rudder at the rear, of course, tends to also guide the machine and a lateral tilting will tend to guide the machine to one side or the other and a vertical tilting will tend to guide it up or down. The controlling is all from the operator's seat by means of levers, links and the like, which enable him to control the operation of any or all of the parts at any time.

I claim:—

1. A flying machine having a plane, rigid wing, means for oscillating said wing and means carried on the underside thereof and intermediate the axis of rotation and the edge of the wing for resisting the outward movement of the air along the underside of the wing.

2. A flying machine having a plane, rigid wing, means for oscillating said wing and means carried on the underside thereof and intermediate the axis of rotation and the edge of the wing for resisting the outward movement of air along the underside of the wing, said means comprising longitudinal vanes pivoted along lines parallel with the axis of rotation and extending inwardly toward the axis of rotation, and means for limiting their outward movement away from the wing.

3. In a flying machine having flapping, oscillating wings means for operating said wings, said means being adapted to cause the wings to have a more rapid upward than downward movement, said means comprising a rotating crank wheel and an oscillating pivotally mounted lever in slidable and pivotal engagement with said wheel, and a link connecting the free ends of said lever with the wing.

4. In a flying machine having flapping, oscillating wings means for operating said wings, said means being adapted to cause the wings to have a more rapid upward than downward movement, said means comprising a rotating crank wheel and an oscillating pivotally mounted lever in slidable and pivotal engagement with said wheel, and a link connecting the free ends of said lever with the wing, and means for moving the fulcrum of said oscillating lever to or from the crank wheel.

JOHN G. BAUER.

Witnesses:
GEORGE S. EBLE,
ROBT. B. LARKIN.